(12) United States Patent
Winckler

(10) Patent No.: US 8,864,426 B2
(45) Date of Patent: Oct. 21, 2014

(54) MACHINE TOOL WITH FLOATING CARRIER DEVICE

(75) Inventor: Friedrich Winckler, Schwäbisch Gmünd (DE)

(73) Assignee: MAG IAS GmbH, Geoppingen (DE)

( * ) Notice: Subject to any disclaimer, the term of this patent is extended or adjusted under 35 U.S.C. 154(b) by 288 days.

(21) Appl. No.: 13/104,296

(22) Filed: May 10, 2011

(65) Prior Publication Data

US 2011/0268521 A1 Nov. 3, 2011

Related U.S. Application Data

(63) Continuation of application No. PCT/EP2009/064095, filed on Oct. 26, 2009.

(30) Foreign Application Priority Data

Nov. 12, 2008 (DE) .......................... 10 2008 058 161

(51) Int. Cl.
*B23Q 1/34* (2006.01)
*B23Q 1/25* (2006.01)
(Continued)

(52) U.S. Cl.
CPC ................. *B23Q 39/023* (2013.01); *B23C 1/04* (2013.01); *B23Q 15/24* (2013.01); *B23Q 1/34* (2013.01); *B23Q 1/0054* (2013.01); *B23Q 15/013* (2013.01); *B23Q 1/70* (2013.01); *B23Q 1/287* (2013.01); *B23Q 3/183* (2013.01); *B23Q 5/32* (2013.01); *B23Q 5/263* (2013.01); *B23Q 2039/002* (2013.01); *B23Q 2210/002* (2013.01)
USPC ........... 409/206; 409/186; 409/235; 409/231; 408/130

(58) Field of Classification Search
CPC ........................ B23Q 2210/002; B23Q 1/0054

USPC ......... 409/206, 185, 231, 232, 235, 204, 207, 409/208, 209, 186–187, 193–194; 408/238, 408/239 R, 129, 130
See application file for complete search history.

(56) References Cited

U.S. PATENT DOCUMENTS 4,312,255 A * 1/1982 Holmstrom ..................... 83/582
4,611,934 A 9/1986 Piotrowski et al.
(Continued)

FOREIGN PATENT DOCUMENTS

| DE | 36 23 112 | 9/1986 |
|---|---|---|
| DE | 198 59 360 | 12/1998 |
| WO | WO 2009/034034 | 3/2009 |

OTHER PUBLICATIONS

Machine Translation DE 19859360 A1, which DE '360 was published Jul. 2000.*

(Continued)

*Primary Examiner* — Erica E Cadugan
(74) *Attorney, Agent, or Firm* — Womble Carlyle Sandridge & Rice, LLP

(57) ABSTRACT

A machine tool is provided, comprising a machine frame, at least one carrier device for a tool or a workpiece by means of which a tool acting on a workpiece or a workpiece being acted upon by a tool is held during the machining of a workpiece, and a holding device holding the at least one carrier device in a non-movable or movable manner relative to the machine frame, wherein a bearing device is provided by means of which the at least one carrier device is mounted in a floating manner on the holding device with displaceability in a direction of displacement along a displacement path, and wherein an adjusting device is provided by means of which the position of the at least one carrier device along the displacement path can be adjusted and fixed.

25 Claims, 11 Drawing Sheets

(51) Int. Cl.
*B23Q 1/70* (2006.01)
*B23Q 5/00* (2006.01)
*B23Q 3/18* (2006.01)
*B23C 1/14* (2006.01)
*B23C 1/04* (2006.01)
*B23Q 39/02* (2006.01)
*B23Q 15/24* (2006.01)
*B23Q 1/00* (2006.01)
*B23Q 15/013* (2006.01)
*B23Q 1/28* (2006.01)
*B23Q 5/32* (2006.01)
*B23Q 5/26* (2006.01)
*B23Q 39/00* (2006.01)

(56) References Cited

U.S. PATENT DOCUMENTS

| | | | |
|---|---|---|---|
| 4,616,447 A * | 10/1986 | Haas et al. | 451/24 |
| 4,697,966 A | 10/1987 | Baur | |
| 5,688,084 A | 11/1997 | Fritz et al. | |
| 5,699,598 A * | 12/1997 | Hessbruggen et al. | 29/27 C |
| 6,666,632 B1 * | 12/2003 | Fioroni | 409/192 |
| 2003/0061921 A1 | 4/2003 | Chen et al. | |
| 2003/0154799 A1 * | 8/2003 | Goldau et al. | 73/760 |
| 2006/0213322 A1 | 9/2006 | Bauer et al. | |
| 2007/0053756 A1 | 3/2007 | Horn et al. | |
| 2009/0162161 A1 | 6/2009 | Prust et al. | |

OTHER PUBLICATIONS

"Trailer Suspended 50' in the Air with Stilts and Wires", by Cory Doctorow, May 18, 2005.*

"Engros: Supported by Stilts", by Daniel S. Weld, Oct. 12, 1991.*

"Wooden Stilt House", printed from www.chinatours.com/travel-guide/guizhou/wooden-stilt-house.html, updated Oct. 26, 2013.*

"Stilt-Suspended Structures: The Hyunjoon Yoo Floating House Has a Great View of the River", from Trend Hunter Magazine, by Meghan Young, Jun. 7, 2011.*

* cited by examiner

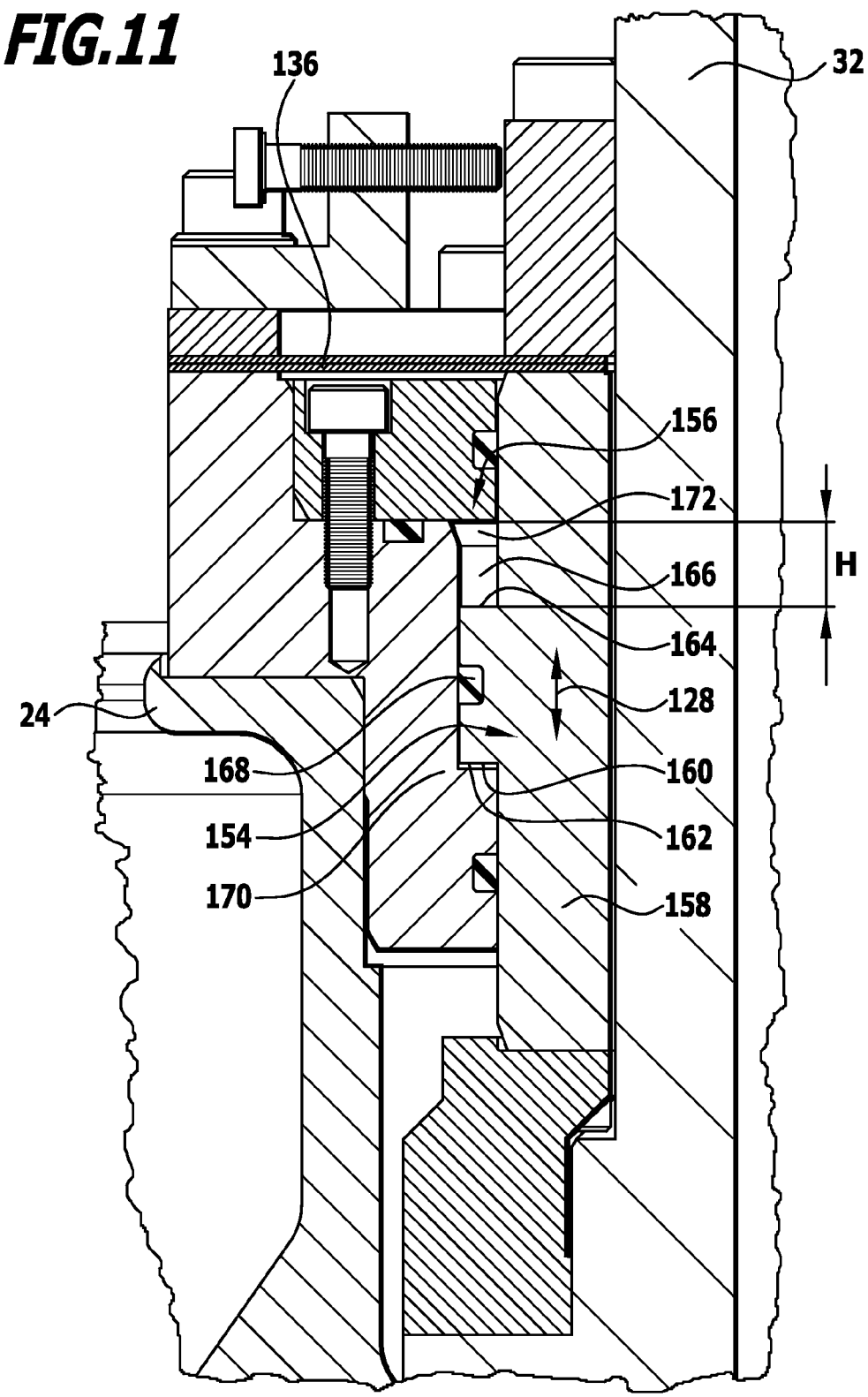

MACHINE TOOL WITH FLOATING CARRIER DEVICE

CROSS-REFERENCE TO RELATED APPLICATIONS

This application is a continuation of international application number PCT/EP2009/064095, filed Oct. 26, 2009, which claims priority to German application No. 10 2008 058 161.5, filed Nov. 12, 2008, both of which are incorporated herein by reference in their entirety and for all purposes.

BACKGROUND OF THE INVENTION

The invention relates to a machine tool comprising a machine frame, at least one carrier device for a tool or a workpiece by means of which a tool acting on a workpiece or a workpiece being acted upon by a tool is held during the machining of a workpiece, and a holding device holding the at least one carrier device in a non-movable or movable manner relative to the machine frame.

The invention further relates to a method of compensating for deviations in a tool length from a reference value.

The holding device is, for example, a slide which is guided for linear displacement on or relative to the machine frame.

The carrier device is, for example, a tool spindle or a workpiece spindle.

EP 0 614 724 B1 discloses a machine tool in which a tool carrier (tool carrier device) arranged on a machine frame is movable, by means of slides, along a first axis and along an axis extending transversely with respect to the first axis. A workpiece carrier (workpiece carrier device) is held on a slide which is movable in the third axis extending transversely with respect to the first and second direction.

WO 2005/077593 A2 discloses a machine tool comprising at least one movable slide having a plurality of holders for tools and/or workpieces. The at least one slide has a plurality of separate partial slides. The relative position of the partial slides in relation to one another can be adjusted and fixed.

Not prepublished WO 2009/034034 A1 describes a machine tool.

DE 10 2006 028 972 A1 discloses a spindle unit which has a work spindle mounted in its own bearing housing for rotation about its longitudinal axis and in which is provided a receiver for tools for the machining of workpieces. An adjusting unit is provided in order to automatically and controllably adjust the work spindle relative to the bearing housing while the work spindle is in operation.

DE 34 22 000 A1 discloses a pressure medium-actuated clamping device for clamping tools or workpieces, in particular for axially clamping tools or workpieces arranged on a shaft, such as grinding wheels, milling tools and the like, said clamping device including a floating annular piston arranged at a face end of the device and axially adjustable via a pressure medium. The annular piston is spring-loaded in a direction of release of the clamping device.

DE 103 29 402 A1 discloses a machine tool, in particular for the synchronous machining of workpieces by a chip-producing method, said machine tool comprising two or more spindle units which are arranged in parallel next to each other in a machining unit and designed to hold tools. Adjusting devices are provided for fine-adjusting the position of the spindle units in relation to one another. The adjusting devices consist of an eccentric bush which is rotatable about a central axis and lockable and in which the spindle units are eccentrically mounted, extending axially parallel to the central axis.

DE 198 59 360 A1 discloses a machine tool, in particular for machining workpieces by a chip-producing method, said machine tool comprising a machining unit and/or a workpiece table and a position correcting device for the machining unit or the workpiece table. At least one electrically driven piezoelectric control element is provided as the position correcting device.

DE 36 23 112 C2 discloses a spindle/nut connecting device having a feed spindle mounted for rotary motion, a ball nut device in engagement with the feed spindle mounted on a displaceable table and displaceable along the feed spindle due to rotation of the feed spindle, and a compensating device.

SUMMARY OF THE INVENTION

In accordance with an embodiment of the invention, a machine tool is provided which enables fine-adjustment of the position of the at least one carrier device at the holding device.

In accordance with an embodiment of the invention, the machine tool comprises a bearing device by means of which the at least one carrier device is mounted in a floating manner on the holding device with displaceability in a direction of displacement along a displacement path, and in that an adjusting device is provided by means of which the position of the at least one carrier device along the displacement path can be adjusted and fixed.

The floating mounting of the at least one carrier device on the holding device allows the position of the carrier device at the holding device to be varied along the displacement path. By way of example, where the carrier device is a tool carrier device, tool length compensation is possible. This allows different tool lengths and also tolerances to be compensated.

For example, a stroke in the range of ±1 mm or ±0.5 mm at an accuracy of ±$\frac{1}{100}$ mm or better can be achieved along the displacement path.

The carrier device can be suspended from the holding device via the floating mounting provided by the bearing device. Therefore, the displacement capability requires no lubrication, since there is no need for a sliding guide or rolling guide to be provided.

The adjusting device allows the position of the carrier device relative to the holding device to be adjusted and fixed with a high degree of accuracy. The flexibility of the position of the carrier device at the holding device along the displacement path can be fixed via the adjusting device.

The adjusting device for the adjustment movement and adjustment positioning can be configured in different ways. In principle, it should comprise a device that can be fixed to the at least one carrier device, and a device that can be fixed to the holding device, with the relative position of these two devices being adjustable. For example, the adjusting device has a pneumatic or hydraulic configuration. Other configurations, such as a ball screw etc., are also possible.

For example, as mentioned above, the solution in accordance with the invention allows deviations in tool lengths to be compensated by an operation which is carried out before the actual workpiece machining begins. In principle, where the carrier device is a tool carrier device, such compensation can be performed directly. It is also possible—where the carrier device is a workpiece carrier device—for such compensation to be carried out indirectly, whereby a variation in tool length is taken account of by repositioning the carrier device accordingly.

The solution in accordance with the invention provides a short-stroke carrier device, and a compact design can be implemented. It is also possible to retrofit existing machine tools because the floating mounting can be designed to be simple and the exact positioning of the carrier device can also be accomplished using simple design. For example, the adjusting device is configured by means of a synchronous-type hydraulic cylinder and a servovalve.

In particular, the displacement path is a linear path. For example, tool length compensation relative to a longitudinal direction of a tool can thereby be carried out in a simple manner.

Furthermore, it is advantageous for the displacement path to be parallel to a major axis of the machine tool and to be, for example, parallel to a major axis for the linear displaceability of workpieces on the machine frame.

Furthermore, it is advantageous for the displacement path to be parallel to a direction of longitudinal extension of the at least one carrier device. For example, a tool compensation operation can thereby be carried out in a simple manner.

In particular, the displacement path is parallel to or coaxial with an axis of rotation of the at least one carrier device. This ensures that repositioning of the carrier device does not lead to an imbalance or the like.

In an embodiment, the at least one carrier device is configured as a motor spindle. For example, it is configured as a tool spindle or workpiece spindle. By the repositioning of the carrier device on the holding device and the floating mounting, the spindle (including a motor) can be displaced as a whole.

It is advantageous for the at least one holding device to have a through-opening through which the at least one carrier device extends. The opening allows the carrier device to be held simply in a floating manner on the holding device.

It is particularly advantageous for the bearing device to comprise at least a first support device and a second support device which are spaced apart from each other, with both the first support device and second support device being fixed at a first area thereof to the holding device and at a second area thereof to the at least one carrier device. A floating mounting of the at least one carrier device on the holding device can thereby be implemented in a simple manner. The first support device and the second support device may be configured as flat elements, for example in the form of sheet metal membranes or packs of sheet metal membranes. A gimbal mounting with displacement capability in the direction of displacement can thereby be implemented in a simple manner. The combination of holding device and at least one float-mounted carrier device can be built in a compact form.

It is advantageous for the first area of the first support device and/or of the second support device to be fixed around a circumference of an edge of an opening in the holding device through which the at least one carrier device extends. This results in a large area for the fixing of the first support device and/or the second support device to the holding device. A floating mounting in the direction of displacement can thereby be implemented in a simple manner, said mounting being capable of being implemented with high stiffness in all directions transverse to the direction of displacement.

For the same reason, it is advantageous for the second area of the first support device and/or of the second support device to be fixed around a circumference of the at least one carrier device on the at least one carrier device.

It is particularly advantageous for the holding device to have a front side facing towards a work space and a rear side facing away from the work space, and for the first support device to be fixed to the front side of the holding device and for the second support device to be fixed to the rear side of the holding device. The first support device and the second support device can have a flat configuration. This results in a compact design, also allowing existing standard machines to be retrofitted, the intervention on the holding device being minimal. In particular, there is no need for the holding device to be converted or exchanged.

It is particularly advantageous for the first support device and the second support device to allow movability of the at least one carrier device in the direction of displacement and inhibit movability of the at least one carrier device in all directions transverse to the direction of displacement. A floating mounting is thereby achieved, the alignment and centring of the at least one carrier device in all directions transverse to the direction of displacement being independent of the position thereof on the displacement path.

For the same reason, it is advantageous for the first support device and the second support device to be soft in a direction parallel to the direction of displacement and to be stiff and torsionally stiff in a direction transverse to the direction of displacement. This enables displaceability along the displacement path, centred alignment of the carrier device relative to the holding device being preserved at each position thereof along the displacement path.

In particular, the first support device and the second support device have an annular configuration or have annularly arranged elements. The first support device and the second support device as a whole, or their elements, surround the at least one carrier device. This gives high radial stiffness and high torsional stiffness while allowing displaceability along the displacement path.

It is advantageous for the first support device and/or the second support device to be of membrane-like configuration. The first support device and the second support device are, in a sense, designed as a "thin skin" (with thickness being related to the direction of displacement). This enables a floating mounting of the at least one carrier device on the holding device to be achieved in a simple manner, with the displaceability of the at least one carrier device being restricted to a direction of linear displacement.

For example, the first support device and/or the second support device are configured as sheet metal plates or packs of sheet metal plates. A "membrane suspension" of the at least one carrier device from the holding device can thereby be achieved in a simple manner.

Generally, a maximum displacement path is less than 5 mm and in particular less than 2 mm in order, for example, to allow tool length compensation to be carried out.

It is advantageous for the at least one carrier device to be suspended from the holding device via the bearing device so as to permit free movement in the direction of displacement. For example, this provides the possibility of carrying out tool length compensation in a simple manner.

It is particularly advantageous for the holding device and the at least one carrier device to have arranged thereon a measuring device for determining the position of the at least one carrier device, or the displacement path. This enables a position of the at least one carrier device relative to the holding device to be adjusted with a high level of precision, for example, achieving a precision of the order of magnitude of $\pm\frac{1}{100}$ mm. When displacement of the at least one carrier device is carried out, then the current position can be checked by means of the measuring device and, based on the current position, the adjusting device can be driven accordingly.

In particular, the measuring device is connected to a control device which drives the adjusting device. This enables the measuring device to transmit position signals to the control device, these signals in turn being used to adjust the position exactly.

It is particularly advantageous for the adjusting device to be adapted to be stiff and/or self-locking in the direction of displacement. This means that when the adjusting device adjusts a certain position, this position is also fixed directly without the need for any additional elements to be provided for fixing this position.

In an advantageous embodiment, the adjusting device has at least one hydraulic or pneumatic adjusting cylinder by means of which the position of the at least one float-mounted carrier device relative to the holding device can be adjusted in a simple and highly accurate manner. For example, the adjusting cylinder is a synchronous-type hydraulic cylinder.

In particular, the at least one adjusting cylinder has a controllable valve device associated with it. Said valve device comprises for example a servovalve. This allows the position of the at least one, float-mounted carrier device to be adjusted with a high degree of accuracy and in a simple manner. It is also possible to preassemble the adjusting cylinder (with or without valve device) on the corresponding carrier device. For example, a carrier device exchange operation (for example, a tool spindle exchange operation) can thereby also be carried out on the machine tool in a simple manner.

In particular, the at least one carrier device has arranged thereat a piston device having a first piston face facing towards a first piston chamber, and a second piston face facing towards a second piston chamber. By corresponding fluid-biasing, for example hydraulic biasing, of the first piston face and the second piston face, the direction of movement of the at least one carrier device and therefore also its position can be adjusted.

In particular, the position of the at least one carrier device can be adjusted by fluid-biasing of the first piston chamber and second piston chamber by means of a valve device. Exact positioning is possible by corresponding fluid-biasing of the first piston chamber and second piston chamber.

Advantageously, the first piston chamber and the second piston chamber are of cylindrical annular configuration. Corresponding piston faces are annular faces. These surround the carrier device. This makes it possible to obtain uniform fluid-biasing over the entire circumference of the carrier device.

It is advantageous for the holding device to have arranged thereat a centring device for the assembly of the at least one carrier device. The carrier device is suspended from the holding device via its floating mounting. The centring device facilitates alignment during assembly.

In particular, the centring device comprises at least one contact element having a contact face for the at least one carrier device, said contact face being oriented transversely to the direction of displacement. When being assembled, the at least one carrier device can be seated against the contact face in order to facilitate centred fixing thereof to the holding device.

In an embodiment, the holding device is a slide which is linearly movable relative to the machine frame. Via the slide, the holding device and the at least one carrier device are linearly movable relative to the machine frame.

It can further be provided for the holding device to itself be held on a slide which is linearly movable relative to the machine frame. For example, a linear movement capability of the at least one carrier device in two linearly independent directions can thereby be implemented in a simple manner.

Further, at least one workpiece carrier device can be provided which is displaceable parallel to the direction of displacement. For example, this enables tool length compensation to be carried out in a simple manner by means of the solution in accordance with the invention.

It is advantageous for n carrier devices to be provided that are aligned parallel to each other and fixed to the same holding device, where n is at least two and wherein at least (n−1) carrier devices are mounted in a floating manner on the holding device. In a dual-spindle machine tool, for example, it is sufficient in principle to have only one spindle mounted in a floating manner in order for tool length compensation to be carried out.

A further object underlying the invention is to provide a method of compensating for deviations in a tool length from a reference value which can be carried out in a simple manner.

In accordance with the invention, this object is accomplished in the method indicated at the outset in that a carrier device holding a tool is positioned, in accordance with the deviation, in a direction of displacement parallel to the direction of the deviation from the reference value, the carrier device being mounted in a floating manner on a holding device so as to permit movement in the direction of displacement and the desired displacement position of the carrier device being fixed by fixing the floating mounting.

The floating mounting of the carrier device on the holding device allows for movability without having to provide, for example, a sliding guide or rolling guide. The floating mounting enables, within a "short-stroke range", high-precision position adjustment of the carrier device relative to the holding device. Fixing the floating mounting also fixes the position of the carrier device relative to the holding device.

The method in accordance with the invention can be carried out on the machine tool in accordance with the invention.

Other advantageous embodiments of the method in accordance with the invention have already been discussed in connection with the machine tool in accordance with the invention.

In particular, the relative position of the carrier device with respect to the holding device is measured, and the measured position is used in the repositioning of the carrier device. This enables the position to be adjusted with a high degree of accuracy.

The following description of preferred embodiments, taken in conjunction with the drawings, serves to explain the invention in greater detail.

BRIEF DESCRIPTION OF THE DRAWINGS

FIG. 11 is an enlarged view of detail B in FIG. 10.

DETAILED DESCRIPTION OF THE INVENTION

Figure 1:
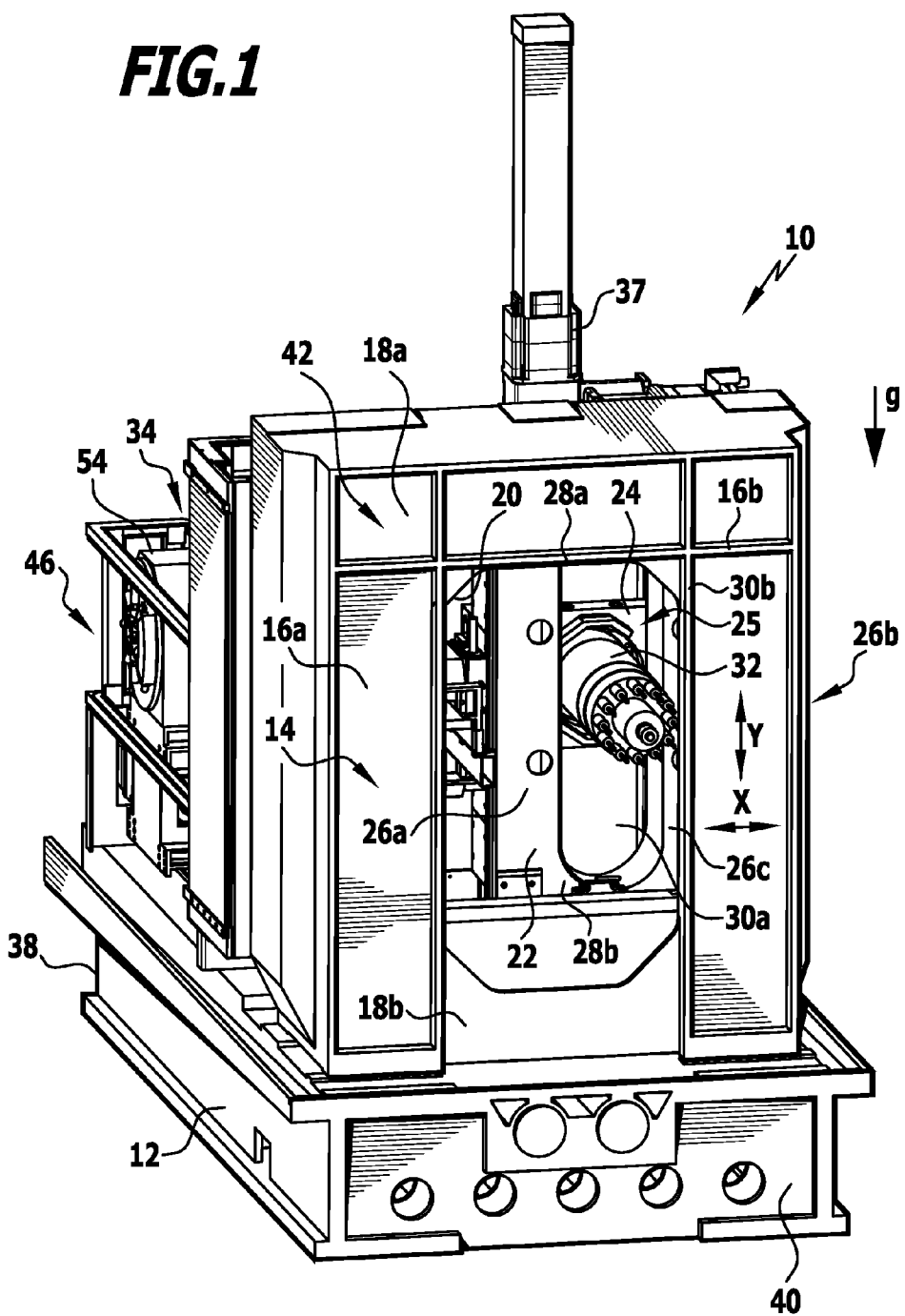
FIG. 1 shows a (partial) perspective view of an exemplary embodiment of a machine tool in accordance with the invention.
Figure 2:
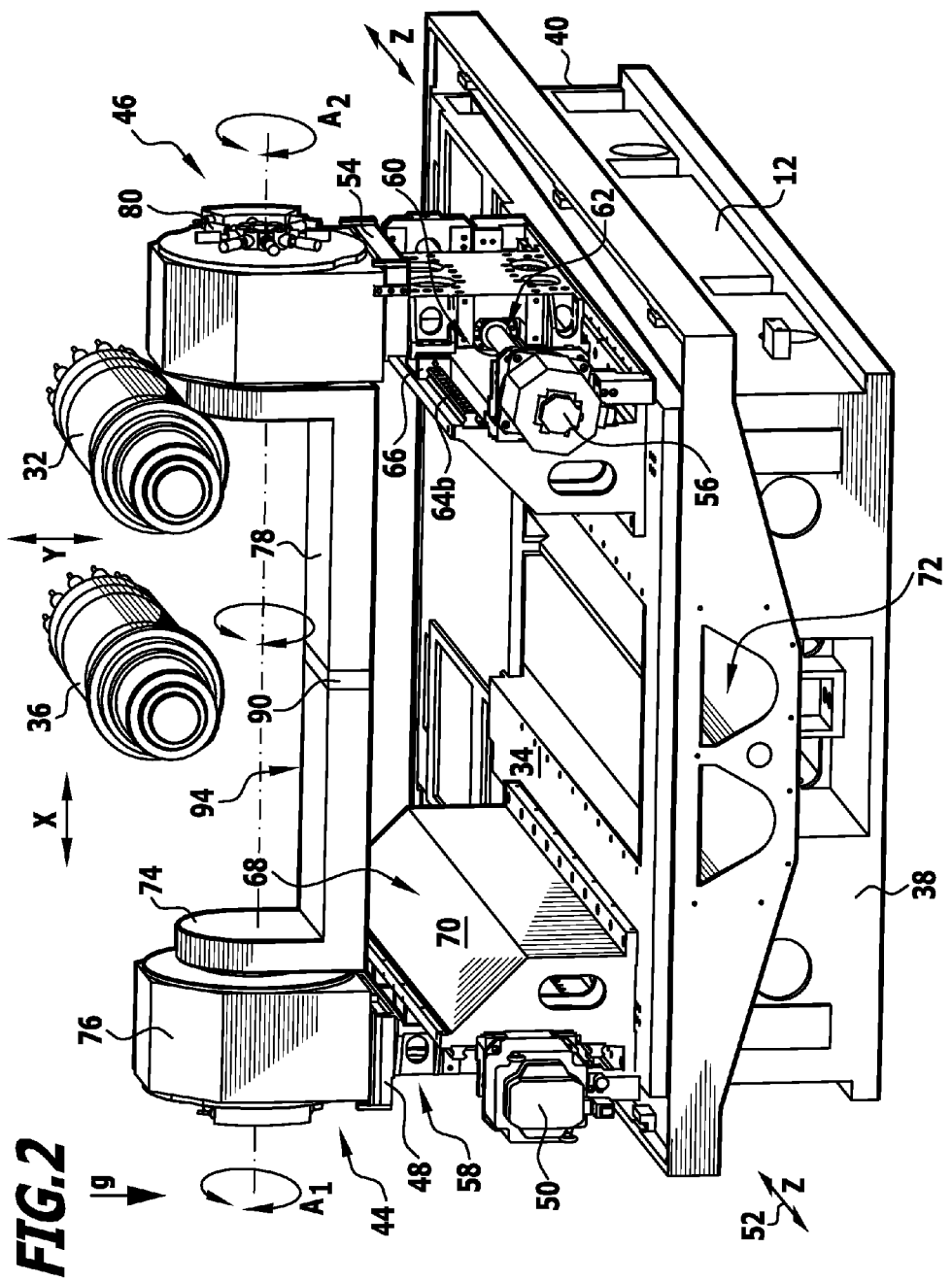
FIG. 2 is a partial view of the machine tool shown in FIG. 1.
Figure 3:
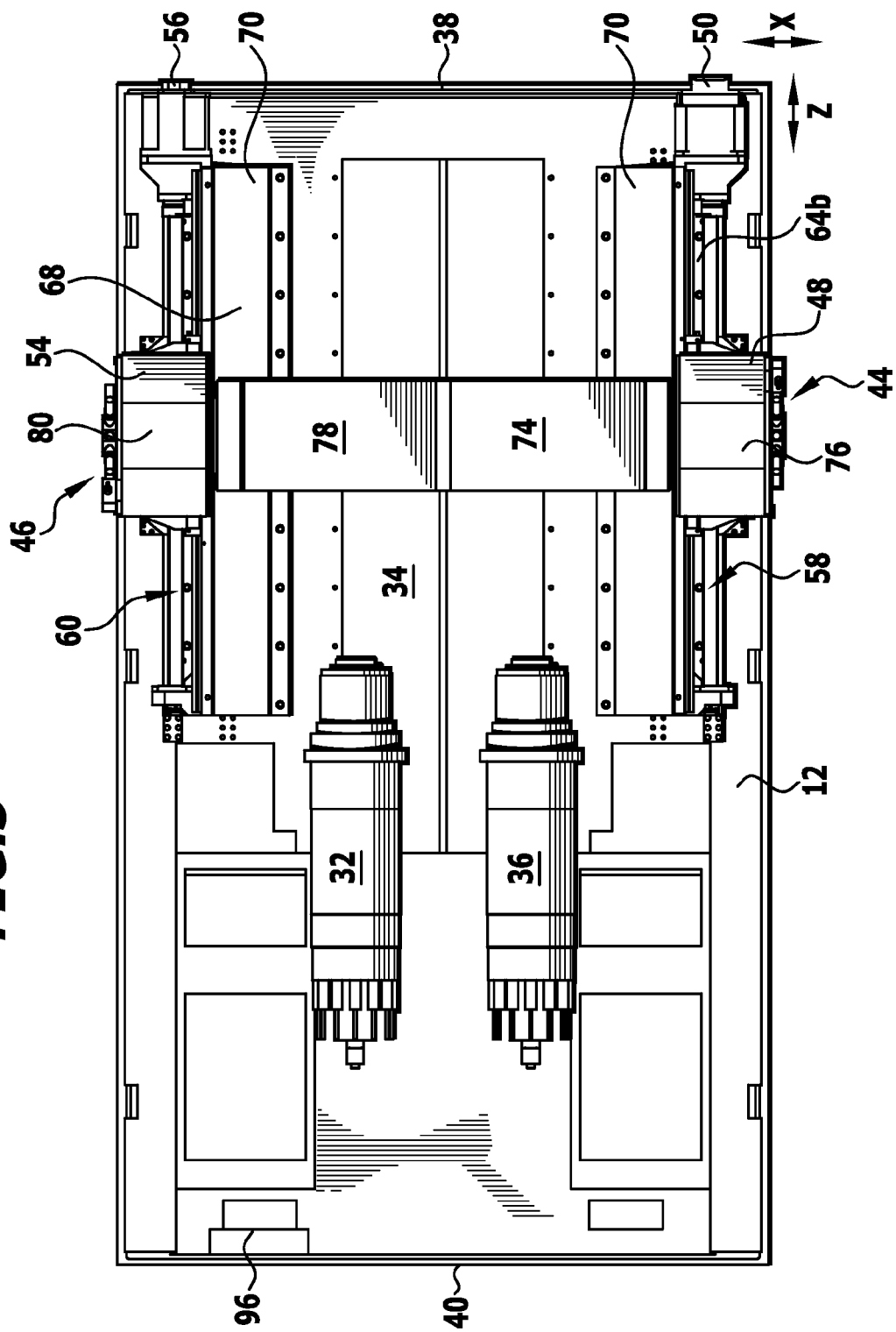
FIG. 3 shows (in top view) a further partial view of the machine tool shown in FIG. 1.
Figure 4:
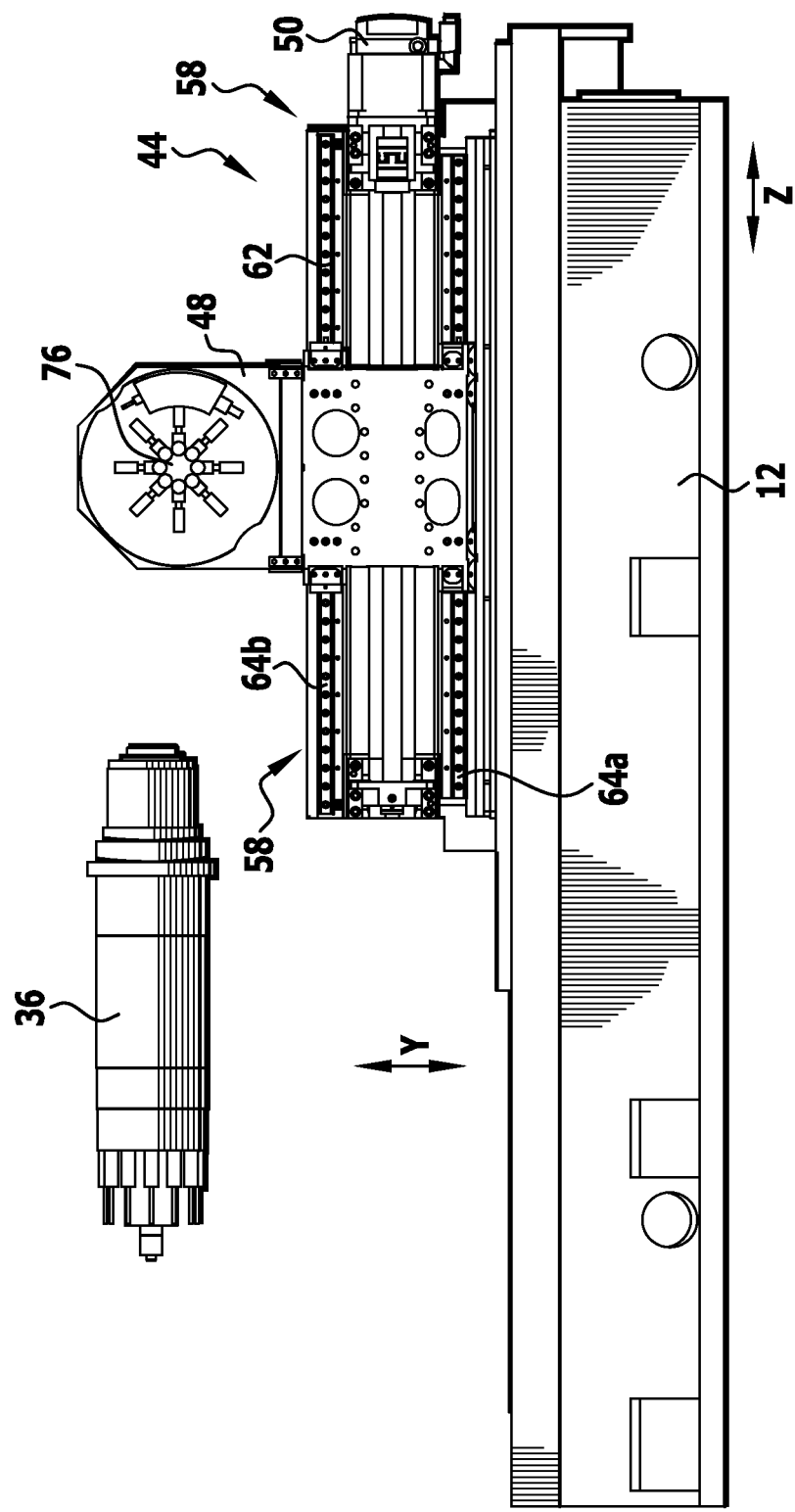
FIG. 4 is a partial side view of the machine tool shown in FIG. 1.
Figure 5:
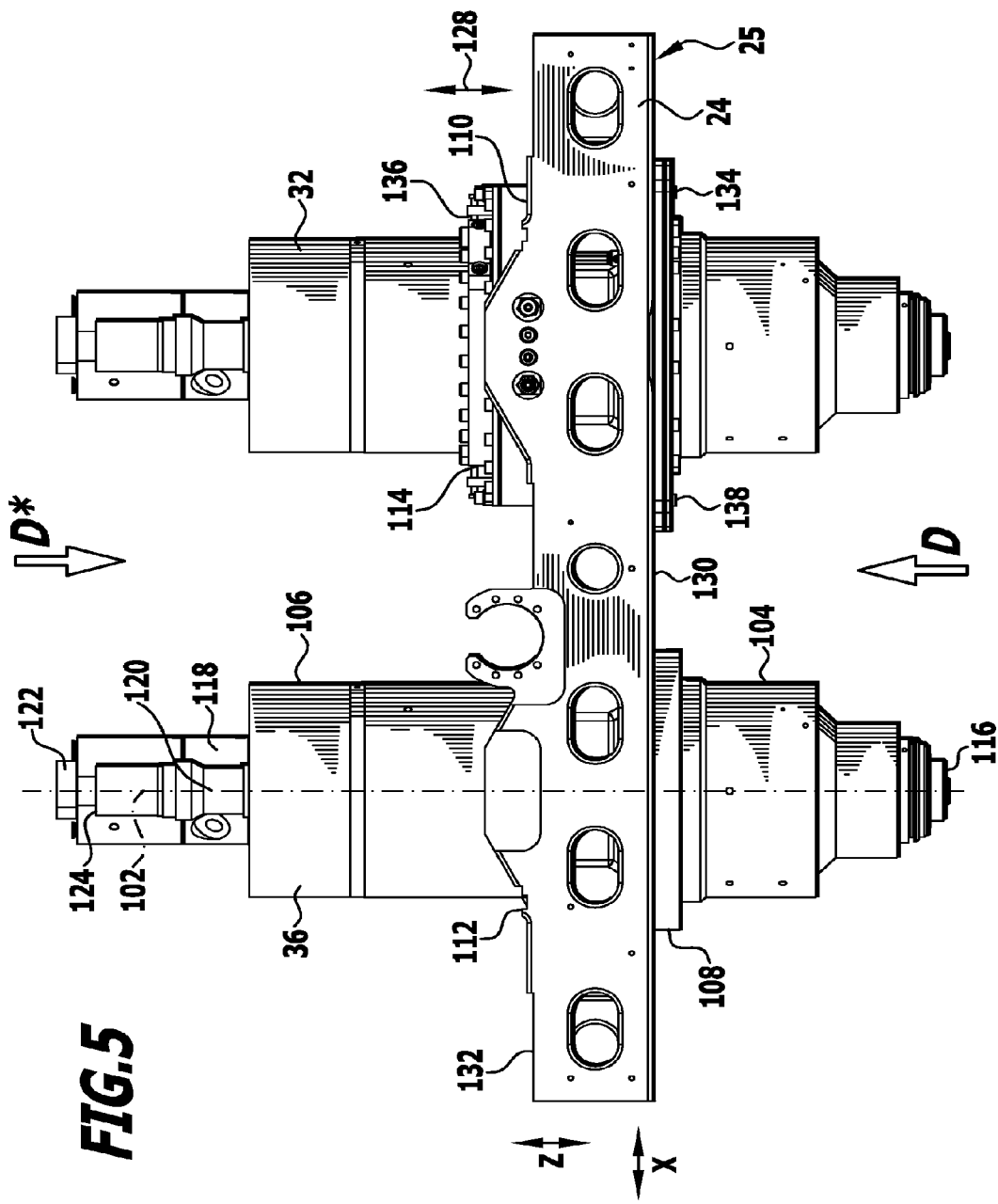
FIG. 5 shows, in top view, a holding device for tool carrier devices of the machine tool shown in FIG. 1.
Figure 6:
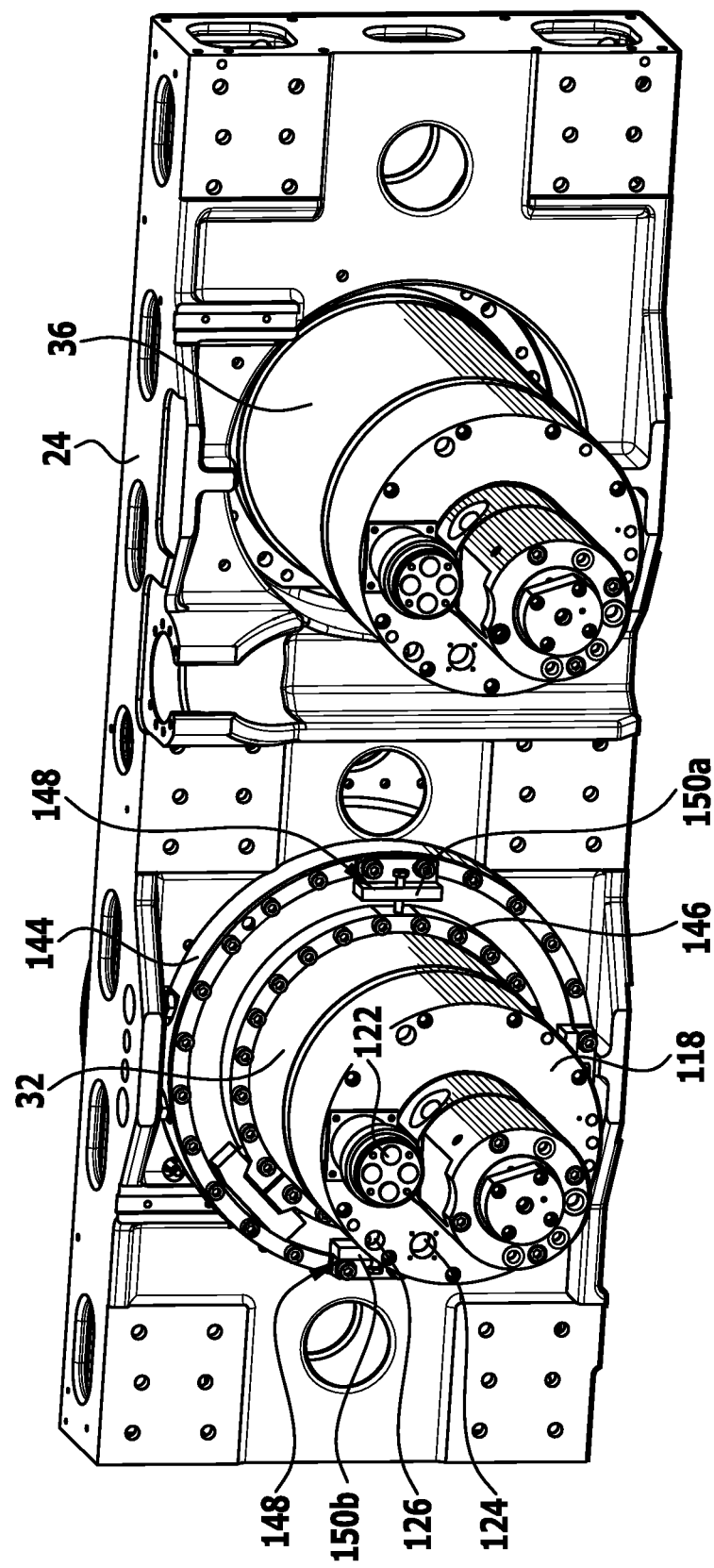
FIG. 6 is a perspective rear view of the holding device shown in FIG. 5 (taken in the direction D*)
Figure 7:
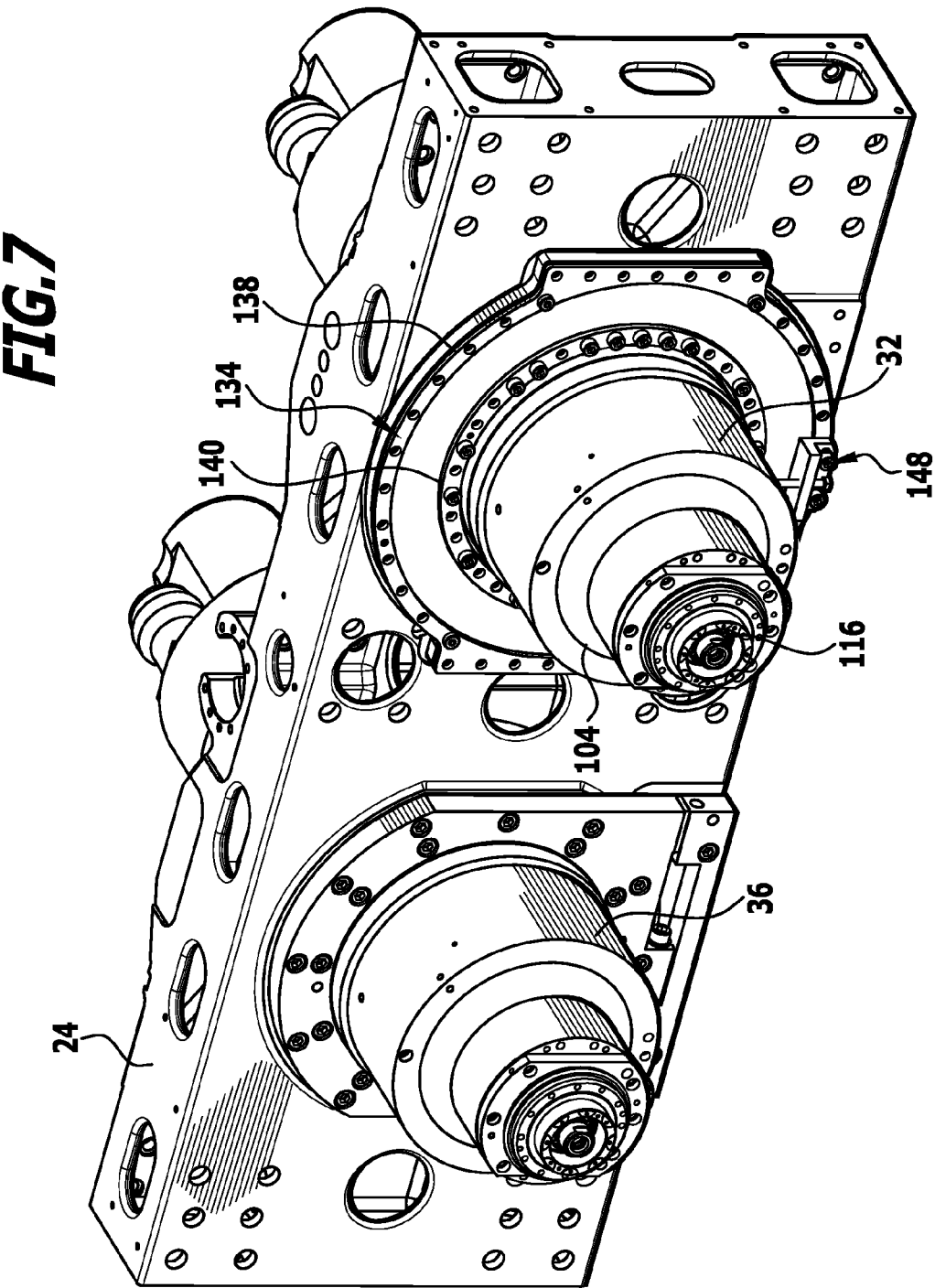
FIG. 7 is a perspective front view of the holding device shown in FIG. 5 (taken from the direction D)
Figure 8:
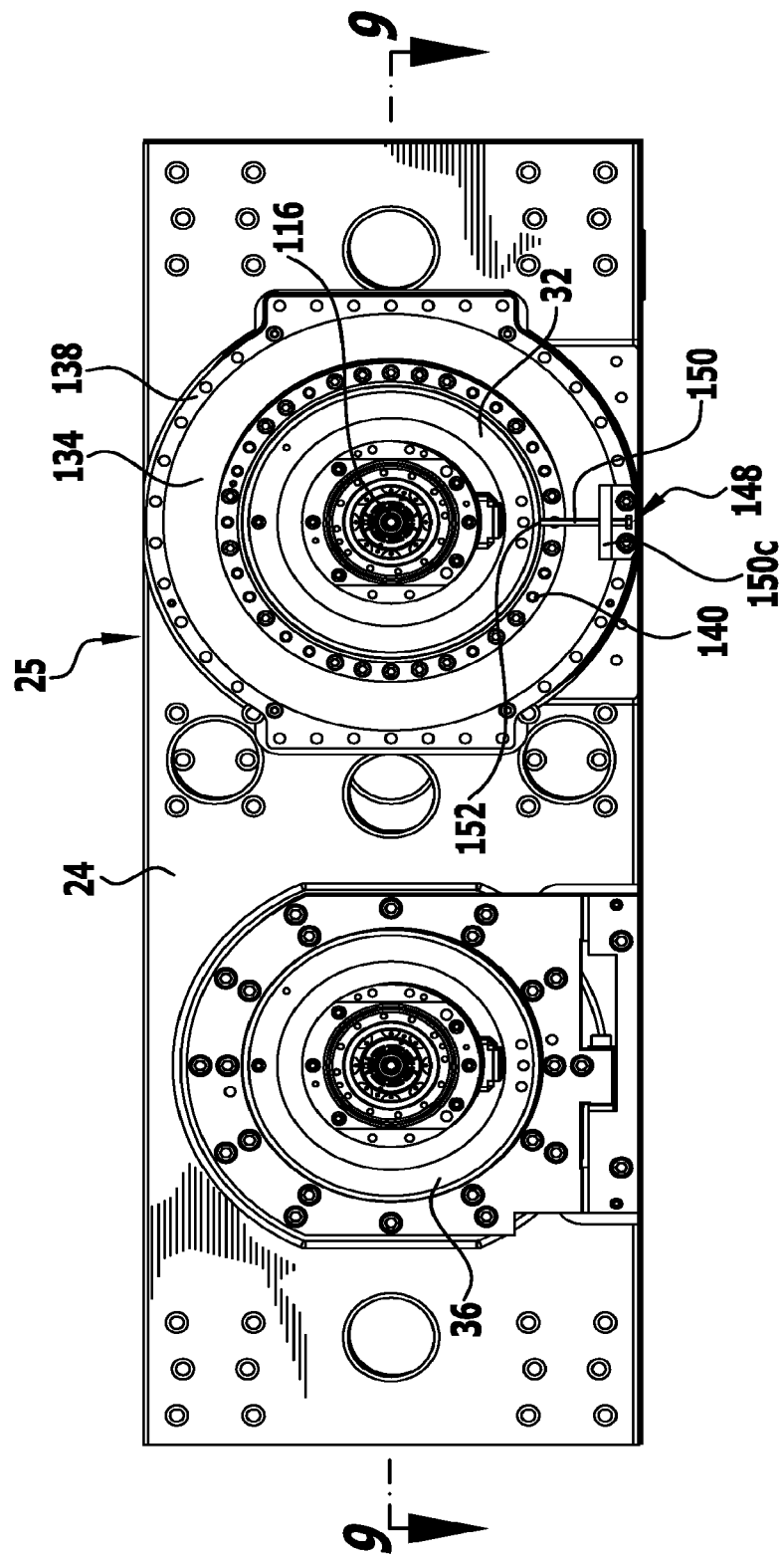
FIG. 8 is a front view of the holding device shown in FIG. 5 taken in the direction D.
Figure 9:
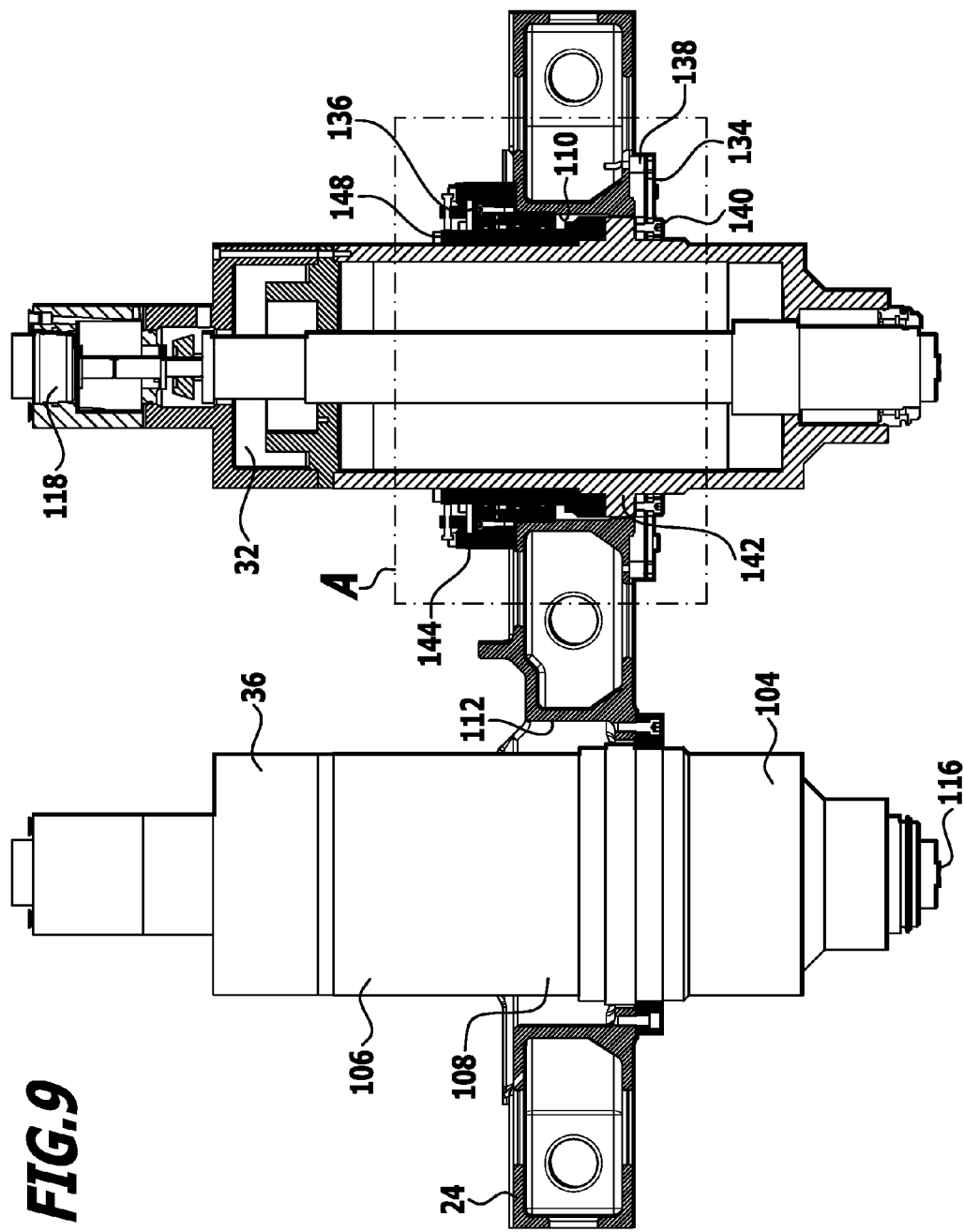
FIG. 9 shows a sectional view taken along line 9-9 in FIG. 8.

An exemplary embodiment of a machine tool in accordance with the invention, which is shown in FIG. 1 (with the workspace enclosure removed), designated therein as 10, and shown in the partial views of FIGS. 2 to 4, comprises a machine bed 12. The machine bed 12 has a generally cuboid enveloping surface. The machine tool 10 is mounted on a base via the machine bed 12.

The machine tool 10 is, for example, a machining centre and is used to machine metal workpieces by a chip-forming process.

Arranged on the machine bed 12 is a machine frame 14 in the form of a column or portal. The machine frame 14 has spaced-apart legs 16a, 16b which are oriented parallel to each other and in particular in a vertical direction (parallel to the direction of gravity). The legs 16a, 16b are joined by an upper connecting member 18a and by a lower connecting member 18b. The lower connecting member 18b faces towards the machine bed 12 or is fixed thereto.

A through-opening 20 is formed between the legs 16a and 16b and between the connecting members 18a and 18b. A (tool carrier) slide 22 (first slide 22) is guided in said opening 20. A first guiding device is arranged on the upper connecting member 18a, and a second guiding device is arranged on the lower connecting member 18b. The machine frame 14 forms a slide carrier for the first slide 22. Said slide is movable in a direction/counter-direction x on the machine frame 14. Said direction x is preferably a horizontal direction with respect to the direction of gravity.

The first slide 22 is driven in its displacement motion by a drive. Said drive may, for example, be a ball screw or a linear motor drive.

A second slide 24 is guided for displacement on the first slide 22. A direction of displacement of the second slide 24 on the first slide 22, which thereby forms a slide carrier for the second slide 24, is perpendicular to the direction x. The corresponding direction y is a vertical direction in relation to the direction of gravity. The second slide 24 is a holding device 25 for two tool carrier devices (see below) which are tool spindles and in particular motor spindles.

The first slide 22 is of (double) yoke-like configuration having a first outer leg 26a and a second outer leg 26b spaced therefrom and a third middle leg 26c interposed between the first leg 26a and the second leg 26b. The first leg 26a, the second leg 26b and the third leg 26c are aligned parallel to each other and oriented in vertical direction. They are joined to each other by an upper connecting member 28a and a lower connecting member 28b.

A first through-opening 30a is formed between the first leg 26a and the third leg 26c and between the upper connecting member 28a and the lower connecting member 28b. A partial area of a first tool carrier device 32 extends through this opening 30a. The first tool carrier device 32 comprises in particular a tool spindle which holds one or more in particular rotatable tools, and workpieces can be machined via a tool in a work space 34.

A second through-opening 30b is formed between the third leg 26c and the second leg 26b and between the upper connecting member 28a and the lower connecting member 28b. A partial area of a second tool carrier device 36 extends through this opening 30b. In particular, the second tool carrier device 36 comprises a tool spindle which is oriented parallel to the tool spindle of the first tool carrier device 32. The second tool carrier device 36 holds one or more rotatable tools via which workpieces can be machined in the work space 34.

In particular, the first tool carrier device 32 and the second tool carrier device 36 are configured as motor spindles.

It is possible for one workpiece to be simultaneously machined via the first tool carrier device 32 and the second tool carrier device 36 in the work space 34 or for a plurality of workpieces to be simultaneously machined in the work space 34.

The second slide 24 is driven in its displacement motion in the direction y by a drive 37. The drive 37 may, for example, be a ball screw or a linear motor drive.

The first tool carrier device 32 and the second tool carrier device 36 are arranged on the same slide (second slide) 24. It is, in principle, also possible for the first tool carrier device 32 and the second tool carrier device 36 to each have their own slide devices associated with them, each with a first slide for x-movability and a second slide for y-movability (not shown in the drawing).

A machine construction in which one or more tool carrier devices are held on a slide (the second slide 24) which is in particular of yoke-shaped configuration, the slide carrier itself being a slide (the first slide 22) which is displaceable, is also referred to as a box-in-box concept. This is described in EP 0 614 724 B1, which is incorporated herein and made a part hereof by reference.

The machine tool 10 has a front end 38 and a rear end 40. The machine frame is arranged both at a spacing from the front end 38 and at a spacing from the rear end 40 on the machine bed 12. A casing 42 may be arranged between the machine frame 14 and the rear end 40 on the machine frame 14. A control device for the machine tool 10 may be arranged in this area.

The work space 34 is between the front end 38 and the machine frame 14.

The machine tool 10 comprises a first workpiece carrier device 44 and a second workpiece carrier device 46. The first workpiece carrier device 44 has a first workpiece slide 48 which has a first drive 50 of its own associated with it. The first drive 50 is, for example, a ball screw or a linear motor drive.

Via the first drive 50, the first workpiece slide 48 is displaceable in a direction of displacement 52. Said direction of displacement 52 (direction z) is perpendicular to the direction x and to the direction y. The first workpiece slide 48 and thus a workpiece being held on it is displaceable in the direction z relative to the machine frame 14.

Correspondingly, the second workpiece carrier device 46 has a second workpiece slide 54 which has a second drive 56 of its own associated with it. The second drive 56 is, for example, a ball screw or a linear motor drive. The direction of displacement of the second workpiece slide 54 is parallel to the direction of displacement 52 and therefore also a direction z.

The first workpiece carrier device 44 and the second workpiece carrier device 46 are spaced apart from each other in the direction x. The work space 34 is between the first workpiece carrier device 44 and the second workpiece carrier device 46.

The first workpiece slide 48 is guided for displacement on a first path guiding device indicated generally at 58. Correspondingly, the second workpiece slide 54 is guided for displacement on a second path guiding device 60. Preferably, the first path guiding device 58 and the second path guiding device 60 are oriented substantially parallel to one another and extend from the front end 38, or from an area in the vicinity of the front end 38, to the machine frame 14.

The first path guiding device 58 and the second path guiding device 60 are arranged on the machine bed 12. They delimit the work space 34 laterally.

The respective guiding device 62 of the first workpiece carrier device 44 and the second workpiece carrier device 46 comprises, for example, a lower guide rail 64a and an upper guide rail 64b on which the associated workpiece slide 48 or 54 is guided (and held) via corresponding guide shoes 66.

The guiding device 62, with its lower guide rail 64a and its upper guide rail 64b, is covered towards the work space with a cover 68. The cover 68 comprises an inclined face 70 which extends in the direction z and is arranged at an acute angle to the direction x. The covers 68 of the first workpiece carrier device 44 and of the second workpiece carrier device 46 are spaced from one another.

Machining waste and in particular machining chips can be fed via the inclined face 70 to a chip removal device 72 which is arranged on the machine bed 12.

Above the upper guide rail 64b, the path guiding devices 58 and 60 are provided with movable covers (sliders) (not shown in the drawings) to cover them from the work space 34. They are respectively provided with a first slider which is fixed on one side of the first workpiece slide 48 and at a first end area of the associated path guiding device 58 or 60, and a second slider which is fixed at an opposite area of the corresponding workpiece slide 48 or 54 and at another end area of the corresponding path guiding device 58 or 60. The sliders are, for example, of bellows-like configuration or configured as a lamella-type device or as a link apron or roller blinds; the associated path guiding device 58 or 60 is covered from the work space in each position of the workpiece slide 48 or 54.

Furthermore, the work space 34 has a work space enclosure associated with it to encapsulate the work space 34 from the outside (not shown in the drawing).

The first workpiece slide 48 has a first bridge element 74 arranged thereon. The first bridge element 74 is arranged for rotation about an axis of rotation $A_1$ on the first workpiece slide 48. The first bridge element 74 serves as a workpiece holder for one or more workpieces to be machined. It is, for example, L-shaped in cross-section.

A first rotary drive 76 is arranged on the first workpiece slide 48 in order to allow rotary movement of the first bridge element 74 about the axis of rotation $A_1$.

The first bridge element 74 protrudes into the work space 34.

Arranged on the second workpiece slide 54 is a second bridge element 78 which faces towards the work space and also has an L-shaped cross-section. It is rotatable about an axis of rotation $A_2$ extending parallel to the axis of rotation $A_1$ via a second rotary drive 80 arranged on the second workpiece slide 54.

The second bridge element 78 is also configured as a workpiece holder or adapted to have a workpiece holder fixed thereon.

The axes $A_1$ and $A_2$ are horizontal axes with respect to the direction of gravity g. They are oriented transversely, and in particular perpendicular, to the direction z and parallel to the direction x.

The first bridge element 74 and the second bridge element 78 each have a fixing area via which the respective element is held for rotation on the associated first workpiece slide 48 or 54. Arranged in the fixing area is a (for example) cuboid area which extends parallel to the axis of rotation $A_1$ or $A_2$.

The first bridge element 74 has a face end opposite a face end of the second bridge element 78. The face end of the first bridge element 74 and the face end of the second bridge element 78 are spaced apart from each other such that the first workpiece slide 48 and the second workpiece slide 54 can be moved past one another or positioned relative to each other without causing the bridge elements 74 and 78 to collide. A space between the face ends can be filled by an intermediate element 90 (after aligning the first bridge element 74 and the second bridge element 78 relative to each other).

The machine tool 10 in accordance with the invention comprises a connecting device having one or more connecting points via which the first bridge element 74 and the second bridge element 78 can be connected, and in particular clamped, together, and therefore the first workpiece slide 48 and the second workpiece slide 54 can be connected together. This provides a workpiece carrier 94 which is formed or held by the combination of the first workpiece slide 48 and the second workpiece slide 54. This also enables large workpieces with sizes of the order of magnitude of, for example, the width of the work space 34 to be machined, or a plurality of workpieces to be "lined up" on the workpiece carrier 94 in order for them to be machined simultaneously or in direct succession (without having to exchange workpieces outside of the work space).

Figure 10:
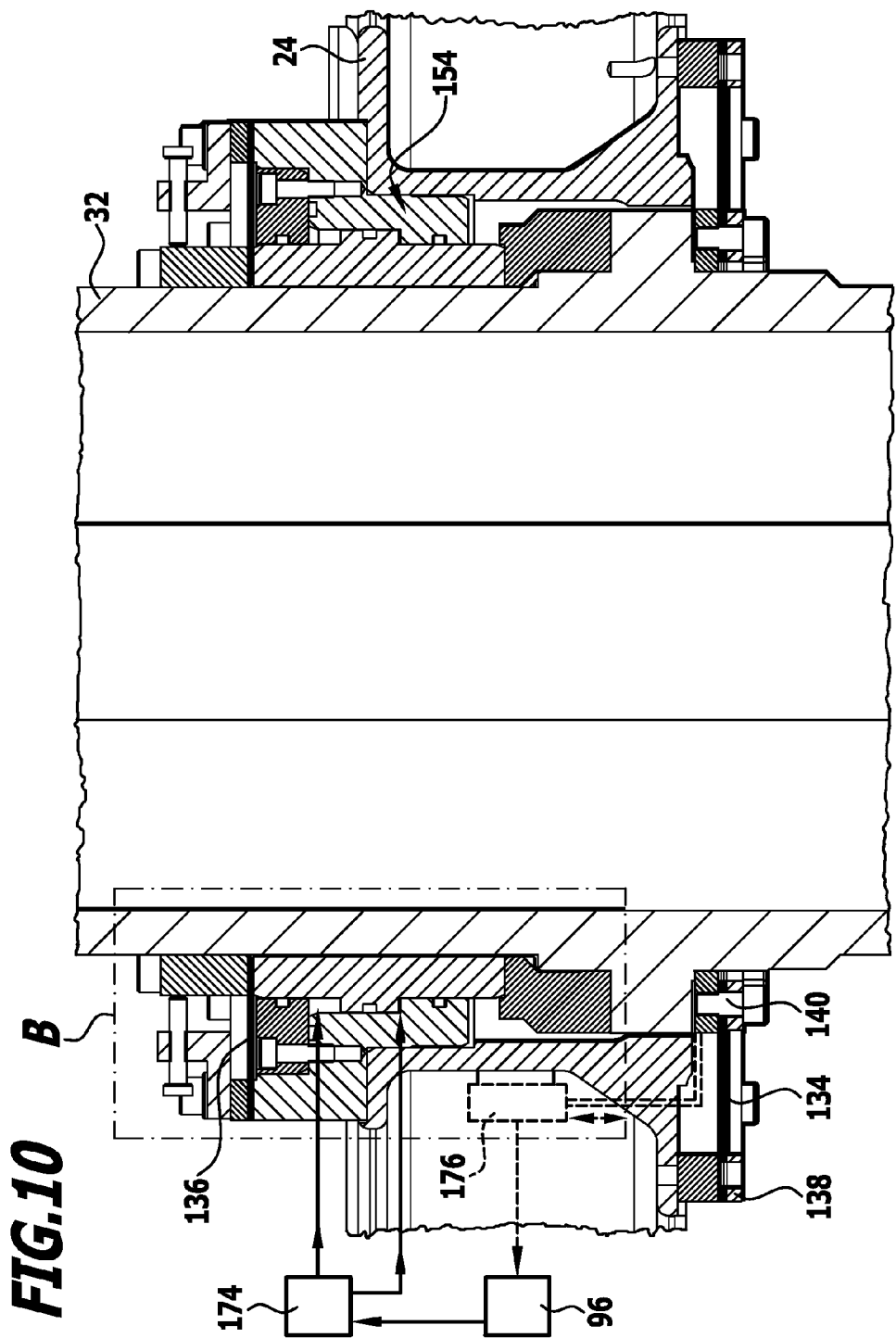
FIG. 10 is an enlarged view of detail A in FIG. 9.

To this end, the machine tool 10 comprises a control device 96 (FIG. 10) via which the first drive 50 for linear displacement of the first workpiece slide 48 and the second drive 56 for linear displacement of the second workpiece slide 54 are synchronizable and also the first drive 76 and the second drive 80 for rotating the workpiece carrier 94 are synchronizable.

The connecting device serves to connect the first bridge element 74 and the second bridge element 78. With respect to its configuration, reference is made to PCT/EP2008/061790, which is incorporated herein and made a part hereof by reference.

With no clamping action applied, the connecting device allows different positioning of the first workpiece slide 48 and the second workpiece slide 54 in the direction z relative to the machine frame 14 as well as different angular positions of the first bridge element 74 and the second bridge element 78. A compensating effect can thereby be obtained. For example, when using two tool carrier devices carrying tools that are, for example, not uniformly worn, then the first workpiece slide and the second workpiece slide can be adjusted relative to each other in order to compensate for this, i.e. to achieve tool wear compensation. A typical order of magnitude for the amount of play 140 (for the maximum adjustability) is ±3 mm.

Furthermore, where desired, an offset of the axes of rotation $A_1$ and $A_2$ can be adjusted.

The tool carrier devices 32 and 36 are fixed to the holding device 25 (FIGS. 5 to 11). In principle, the first tool carrier device 32 and the second tool carrier device 36 are of identical configuration and are configured in particular as motor spindles. They each have a direction of longitudinal extension 102 which is parallel to the direction z.

When a workpiece is machined, tools which are fixed to the tool carrier devices 32 and 36 act upon one or more workpieces which are fixed to the workpiece slides 48 and 44.

The first tool carrier device 32 and the second tool carrier device 36 each have a front area 104 facing towards the work space 34 or arranged within the work space 34, a rear area 106 facing away from the work space 34, and a middle area 108 via which the corresponding tool carrier device 32 or 36 is fixed to the holding device 25.

To this end, the holding device 25 has a first through-opening 110 and a second opening 112 spaced therefrom. The first opening 110 and the second opening 112 each have an axis parallel to the respective direction of longitudinal extension 102 of the tool carrier devices. The first tool carrier device 32 extends through the first opening 110 and the second tool carrier device 36 extends through the second opening 112.

The second tool carrier device 36 is fixed to the holding device 25 in a non-movable (immovably rigid) manner. The first tool carrier device 32 is held in a floating manner on the holding device 25 via a bearing device 114, as will be explained in more detail below.

Arranged in the front area 104 of each of the first tool carrier device 32 and the second tool carrier device 36 is an interface 116, such as an HSK (hollow taper shank) interface, for fixing a tool.

The first tool carrier device 32 and the second tool carrier device 36 are configured as tool spindles and in particular motor spindles having a motor 118 for rotationally driving the interface 116 and, with it, a tool held thereon. A tool held thereon can be rotated about an axis of rotation 120. The axis of rotation 120 is aligned parallel to the direction of longitudinal extension 102 and parallel to the direction z.

The first tool carrier device 32 and the second tool carrier device 36 each have a first connecting device 122 (FIG. 6) which serves to supply electric power to the corresponding motor 118. They further have a second connecting device 124 which serves to provide (electrical) control signals from the control device 96. Furthermore, a third connecting device 126 is provided via which one or more fluids and in particular coolant and/or lubricant can be provided. The third connecting device 126 can also comprise an interface for a pneumatic connection and/or hydraulic connection.

The connecting devices 122, 124 and 126 are arranged in the rear area 106 of the respective first tool carrier device 32 and second tool carrier device 36.

The second tool carrier device 36 is held immovable in the direction z on the holding device 25. The first tool carrier device 32 can be displaced and positioned in a direction of displacement 128 along a displacement path by means of the bearing device 114. The direction of displacement 128 is parallel to the direction z. It is parallel to the axis of rotation 120 of the first tool carrier device 32. Further, it is parallel to the direction of longitudinal extension 102 of the first tool carrier device 32.

The holding device 25 (the second slide 24) has a front side 130 facing towards the work space 34. The front areas 104 of the first tool carrier device 32 and second tool carrier device 36 protrude beyond said front side 130. The holding device 25 further has a rear side 132 facing away from the work space 34. The rear areas 106 of the first tool carrier device 32 and second tool carrier device 36 protrude beyond said rear side 132.

The bearing device 114 comprises a first support device 134 and a second support device 136 for floating mounting of the first tool carrier device 32. The first support device 134 is fixed to the front side 130 of the holding device 25 and surrounds the first opening 110. It has a first area 138 via which it is fixed to the holding device 25. For example, the first support device 134 is fixed at the first area 138 thereof to the holding device 25 by means of a plurality of in particular uniformly distributed screws or bolts.

The first support device 134 is fixed at a second area 140 thereof to the first tool carrier device 32. To this end, the latter has (for example) an annular flange 142 to which the first support device 134 is fixed via the second area 140 thereof using a plurality of in particular uniformly distributed screws or bolts. The fixing is realized in particular over the (entire) circumference of the first tool carrier device 32.

The first support device 134 has a ring-shaped configuration and surrounds the first tool carrier device 32, covering the first opening 110.

Correspondingly, the second support device 136 is fixed at a first area 144 thereof to the rear side 132 of the holding device 25. It is fixed to the first tool carrier device 32 at a second area 146 thereof. As before, the fixing is realized over the (entire) circumference of the first tool carrier device 32 and an edge of the first opening 110. The second support device 136 is also of ring-shaped configuration and covers the first opening 110 on the rear side 132.

The first support device 134 and the second support device 136 are soft in terms of displaceability in the direction of displacement 128. They are stiff in all transverse directions and torsionally stiff. The first tool carrier device 32 is thereby held on the holding device 25 in a floating manner via the bearing device 114, whereby the first tool carrier device 32 is free to move in the direction of displacement 128, with linear displaceability along a displacement path in the direction of displacement 128 being possible. Movability in all directions transverse to the direction of displacement 128 (in radial directions with respect to the axis of rotation 120) is inhibited.

The first support device 134 and the second support device 136 are of correspondingly flat configuration (in a direction parallel to the direction of displacement 128) in order to make the floating mounting possible. They are in particular membrane-like in the sense that in the membrane state of stress, they deflect along the displacement path in the direction of displacement 128 and, when loaded, resist only forces in tension parallel to the direction of displacement 128. A typical thickness of the first support device 134 and the second support device is of the order of magnitude of 0.5 mm to 5 mm.

In particular, the first support device 134 and the second support device 136 are formed by a sheet metal element and in particular by a sheet metal plate or by a pack of sheet metal plates.

In an exemplary embodiment, the first support device 134 and the second support device 136 are integrally formed.

In principle, it is also possible for the "softness" in the direction of displacement 128 and the stiffness in all transverse directions thereto to be obtained by the first support device 134 and the second support device 136 having a plurality of radially arranged individual elements which are distributed and fixed around the edge of the first opening 110 in the holding device 25 and are fixed to the first carrier device 32.

The first tool carrier device is suspended from the holding device 25 in slide-less manner via the first support device 134 and the second support device 136 spaced therefrom. The floating mounting provides displaceability parallel to a major axis of the machine tool 10, namely in the direction z. Along said displacement path, an adjustment of the position of the first tool carrier device 32 relative to the holding device 25 and thus also relative to the second tool carrier device 36 (which is fixed with respect to movement in the direction z) is possible. A corresponding stroke of the first tool carrier device 32 in the direction of displacement 128 is limited by the membrane-like configuration of the first support device 134 and second support device 136. A typical value for the maximum stroke is 2 mm. In a concrete embodiment, a stroke of ±0.5 mm and thus a total stroke of 1 mm is allowed ("short stroke").

The holding device 25 has a centring device 148 associated with it which serves to facilitate mounting of the first tool carrier device 32 onto the holding device 25. The centring device 148 is non-effective when the machine tool 10 is in operation. The centring device 148 comprises contact elements 150a, 150b, 150c arranged on the front side 130 and rear side 132 of the holding device 25. Said contact elements each have a contact face 152 which is oriented transversely to the direction of displacement 128. During assembly and before the first tool carrier device 32 is fixed to the holding device 25 by means of the first support device 134 and the second support device 136, the holding device 25 can be precisely aligned via the contact elements 150a, 150b, 150c, which are in particular configured as screws.

In the solution in accordance with the invention, the first tool carrier device 32, via the bearing device 114, is mounted in a floating manner for free movement in the direction of displacement 128 and no slide guide or the like is provided for the first tool carrier device 32; therefore, a specific effort is required for it to be aligned transversely to the direction of displacement 128.

The first tool carrier device 32 has an adjusting device 154 associated with it (FIGS. 10, 11) which allows a position of the first tool carrier device along the displacement path in the direction of displacement 128 to be adjusted with a high level of accuracy and the corresponding position to be fixed. The fixing stops the free movability. To this end, the adjusting device 154 is adapted to be stiff in the direction of displacement 128 and for example self-locking. The gimbal mounting of the first tool carrier device 32 via the bearing device 114 can be "blocked" via the adjusting device 154, i.e. the free displaceability along the displacement path in the direction of displacement 128 can be stopped.

The adjusting device 154 comprises an adjusting cylinder 156. The adjusting cylinder 156 in turn comprises a piston device 158 having a first piston face 160 facing and delimiting a first piston chamber 162. The piston device 158 further comprises a second piston face 164 facing and delimiting a second piston chamber 166. A seal 168, for example in the form of an O-ring, is arranged between the first piston face 160 and the second piston face 164. The first piston face 160 and the second piston face 164 are annular faces surrounding the first carrier device 32. Correspondingly, the first piston chamber 162 and the second piston chamber 166 are annular spaces surrounding the first tool carrier device 32.

The first piston face 160 and the second piston face 164 lie opposite each other. By corresponding pressure biasing, the piston device 158 can be moved and thus the first tool carrier device 32 can be displaced on the holding device 25. The direction of movement is adjusted depending on whether one of the first piston chamber 162 or the second piston chamber 166 has a positive pressure relative to the other piston chamber. The maximum stroke of displaceability and the direction of displacement 128 are indicated by H in FIG. 11 and determined by the extension of the first piston chambers 162 and 166 parallel to the direction of displacement 128.

The adjusting cylinder 156 has a piston receiver 172 which is delimited by a wall 170 and within which the piston device 158 can be moved.

The first piston chamber 162 and the second piston chamber 166 can be biased with hydraulic fluid. A valve device 174 is provided via which the fluid-biasing can be adjusted. The first tool carrier device 32 can thereby be positioned, the position along the displacement path being fixed.

In particular, the valve device 174 comprises a servovalve. This allows the pressure biasing of the piston device 158 to be controlled with a high level of precision, this in turn allowing the position of the first tool carrier device 32 along the displacement path in the direction of displacement 128 to be adjusted with a high level of precision.

The adjusting cylinder 156 is, for example, configured as a synchronous cylinder. A synchronous-type hydraulic cylinder is double-acting via the first piston face 160 and the second piston face 164. At a constant volume flow of hydraulic fluid, the stroke force and the stroke speed are equal in both directions of movement.

In particular, the valve device 174 is driven by means of the control device 96.

Arranged on the holding device 25 and the first tool carrier device 32 is a measuring device 176 by means of which the (instantaneous) position of the first tool carrier device 32 on the displacement path can be measured. For example, the measuring device 176 comprises a glass measuring rod for determining the position of the first tool carrier device. Other configurations of the measuring device 176 are also possible.

The measuring device 176 transmits its measuring signals to the control device 96 such that, in principle, the position of the first tool carrier device 32 is known at any time and that a position, when adjusted, can be adjusted with a high level of accuracy. The measuring device 176 determines directly the relative position of the first tool carrier device 32 along the displacement path relative to the holding device 25; the position or movement of the first tool carrier device 32 is tapped directly and provided to the valve device 174 directly or via the control device 96. When a position of the first tool carrier device 32 is preset, the first tool carrier device 32 is then driven accordingly and can be stabilized in its position even under the action of external forces.

The machine tool in accordance with the invention operates as follows:

The machine tool 10 is configured as a dual-spindle machine tool having a first tool carrier device 32 and a second tool carrier device 36. In principle, tools that are being held on the first tool carrier device 32 and second tool carrier device 36 may have slightly different configurations or may be worn to different degrees.

The machine tool in accordance with the invention enables such a deviation in length (in the direction of displacement 128) to be compensated via the first tool carrier device 32. A typical maximum stroke is of the order of magnitude of about 1 mm.

The first tool carrier device 32 is mounted in a floating manner via the bearing device 114. It is mounted for free linear displacement in the direction of displacement 128. This linear displacement capability operates without lubrication; there is no sliding guide or rolling guide. By the use of the first support device 134 and the second support device 136 (with additional support devices being possible), high radial stiffness and high torsional stiffness of the suspension is obtained such that the first tool carrier device 32 is "gimbal-" and float-mounted on the holding device 25.

This results in a compact design. In principle, it is even possible for a standard machine to be retrofitted accordingly.

The adjusting device 154 provides for the adjustment of a desired position of the first tool carrier device 32 along the displacement path, with the desired position for the adjusting device 154 being fixed. Adjustment can be made with a high degree of accuracy. The measuring device 176 is used to tap directly the relative position and relative movement of the first tool carrier device 32 with respect to the holding device 25.

In principle, it is possible for the first tool carrier device 32 and the adjusting cylinder 156 to be preassembled so that they can be exchanged quickly on the machine tool 10.

In the machining of a workpiece in which a tool held on the first tool carrier device 32 acts upon the workpiece, the position of the first tool carrier device 32 relative to the holding device 25 is fixed.

The adjustability of the position of a carrier device relative to a holding device has been described above with reference to a tool carrier device. In principle, it is also possible for the solution in accordance with the invention to be used in connection with a workpiece carrier device. A machine tool having two workpiece spindles is described in WO 2004/012888 A1, which is incorporated herein and made a part hereof by reference.

In principle, for a machine tool having n tool carrier devices or workpiece devices aligned parallel to each other, it is sufficient to provide (n−1) carrier devices that are mounted in a floating manner. For example, in a dual-spindle machine tool, it is sufficient to have only one spindle mounted in a floating manner in accordance with the solution of the invention.

The solution in accordance with the invention allows the deviation of a tool from a reference value (which is, for example, predetermined by a tool that is fixed to an immobile tool carrier device corresponding to the second tool carrier device 36) to be easily compensated. To this end, the adjusting device 154 is used to adjust the float-mounted first tool carrier device 32 in accordance with the deviation from the reference value such that compensation is achieved. The corresponding displacement position is fixed by fixing the first tool carrier device 32 on the floating bearing device 114.

The solution in accordance with the invention, having the carrier device and in particular the first tool carrier device 32 mounted in a floating manner on the holding device 25, can be implemented alone or in combination with a z-compensation capability on the workpiece carrier devices 44 and 46.

The invention claimed is:

1. Machine tool comprising:
a machine frame:
a carrier device which holds a tool adapted for acting on a workpiece during the machining of the workpiece;
a holding device holding the carrier device relative to the machine frame, wherein the holding device has a through-opening through which the carrier device extends;
a bearing device by means of which the carrier device is mounted in a floating manner within the through-opening of the holding device with displaceability in a direction of displacement along a displacement path, wherein the carrier device is suspended from the holding device via the bearing device so as to permit free movement of the carrier device in the direction of displacement, wherein the bearing device comprises a first support device and a second support device which are spaced apart from one another, each of the first support device and second support device being fixed at a first area thereof to the holding device and at a second area thereof to the carrier device, and wherein at least one of the first support device and second support device are of membrane-like configuration; and
an adjusting device by means of which the position of the carrier device along the displacement path is adjustable and fixable.

2. Machine tool in accordance with claim 1, wherein the displacement path is a linear path.

3. Machine tool in accordance with claim 1, wherein the displacement path is parallel to a movement axis of the machine tool.

4. Machine tool in accordance with claim 1, wherein the displacement path is parallel to a direction of a longitudinal axis of the carrier device.

5. Machine tool in accordance with claim 1, wherein the displacement path is parallel to or coaxial with an axis of rotation of the carrier device.

6. Machine tool in accordance with claim 1, wherein the carrier device is configured as a motor spindle.

7. Machine tool in accordance with claim 1, wherein the first area of at least one of the first support device and second support device is fixed around a circumference of an edge of the through-opening of the holding device through which the carrier device extends.

8. Machine tool in accordance with claim 1, wherein the second area of at least one of the first support device and second support device is fixed around a circumference of the carrier device.

9. Machine tool in accordance with claim 1, wherein the holding device has a front side and a rear side, wherein the front side is positioned closer to the work space than the rear side, and wherein the first support device is fixed to the front side of the holding device and the second support device is fixed to the rear side of the holding device.

10. Machine tool in accordance with claim 1, wherein the first support device and the second support device allow movability of the carrier device in the direction of displacement and inhibit movability of the carrier device in all directions transverse to the direction of displacement.

11. Machine tool in accordance with claim 1, wherein the first support device and the second support device have an annular configuration.

12. Machine tool in accordance with claim 1, wherein at least one of the first support device and second support device are configured as sheet metal plates or packs of sheet metal plates.

13. Machine tool in accordance with claim 1, wherein a maximum displacement of the carrier device in the direction of displacement is less than 5 mm.

14. Machine tool in accordance with claim 1, wherein the holding device and the carrier device have arranged thereon a measuring device for determining the position of the carrier device along the displacement path.

15. Machine tool in accordance with claim 14, wherein the measuring device is connected to a control device which drives the adjusting device.

16. Machine tool in accordance with claim 1, wherein the adjusting device is adapted to be self-locking in the direction of displacement.

17. Machine tool in accordance with claim 1, wherein the adjusting device has at least one adjusting cylinder.

18. Machine tool in accordance with claim 17, wherein the at least one adjusting cylinder has a controllable valve device associated with it.

19. Machine tool in accordance with claim 17, wherein the carrier device has arranged thereat a piston device having a first piston face proximate to a first piston chamber, and a second piston face proximate to a second piston chamber.

20. Machine tool in accordance with claim 19, wherein the position of the carrier device along the displacement path is adjustable by fluid-biasing of the first piston chamber and the second piston chamber by means of a valve device.

21. Machine tool in accordance with claim 20, wherein at least one of the first piston chamber and second piston chamber are of cylindrical annular configuration.

22. Machine tool in accordance with claim 1, wherein the holding device has arranged thereat a centering device comprising at least one contact element having a contact face positioned such that the carrier device can be seated against the contact face during assembly of the carrier device, said contact face being oriented transversely to the direction of displacement.

23. Machine tool in accordance with claim 1, wherein the holding device is a slide which is linearly movable relative to the machine frame.

24. Machine tool in accordance with claim 1, wherein the holding device is held on a slide which is linearly movable relative to the machine frame.

25. Machine tool in accordance with claim 1, wherein at least one workpiece carrier device is provided which is displaceable parallel to the direction of displacement of the carrier device.

\* \* \* \* \*